(12) United States Patent
Yang

(10) Patent No.: US 11,064,429 B2
(45) Date of Patent: Jul. 13, 2021

(54) INFORMATION TRANSMISSION METHOD AND APPARATUS

(71) Applicant: Guangdong OPPO Mobile Telecommunications Corp., Ltd., Guangdong (CN)

(72) Inventor: Ning Yang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/310,419

(22) PCT Filed: Sep. 7, 2016

(86) PCT No.: PCT/CN2016/098300
§ 371 (c)(1),
(2) Date: Dec. 14, 2018

(87) PCT Pub. No.: WO2018/045506
PCT Pub. Date: Mar. 15, 2018

(65) Prior Publication Data
US 2019/0335387 A1    Oct. 31, 2019

(51) Int. Cl.
| H04W 48/16 | (2009.01) |
| H04W 52/02 | (2009.01) |
| H04W 48/20 | (2009.01) |
| H04W 68/02 | (2009.01) |

(52) U.S. Cl.
CPC ....... *H04W 52/0206* (2013.01); *H04W 48/16* (2013.01); *H04W 48/20* (2013.01); *H04W 52/0216* (2013.01); *H04W 68/025* (2013.01)

(58) Field of Classification Search
CPC ... H04W 48/16; H04W 48/20; H04W 68/025; H04W 52/0216; H04W 52/0206
See application file for complete search history.

(56) References Cited

U.S. PATENT DOCUMENTS

| 7,389,332 B1 * | 6/2008 | Muchow | H04L 12/403 370/254 |
| 2013/0088984 A1 * | 4/2013 | Lee et al. | H04W 24/00 |
| 2015/0049649 A1 | 2/2015 | Zhu et al. | |
| 2016/0044576 A1 * | 2/2016 | Hahn | H04W 48/08 455/434 |

(Continued)

FOREIGN PATENT DOCUMENTS

| CN | 102761827 A | 10/2012 |
| CN | 103997756 A | 8/2014 |
| CN | 104519555 A | 4/2015 |

(Continued)

OTHER PUBLICATIONS

EP Search Report dated Mar. 19, 2019.
(Continued)

*Primary Examiner* — Jamal Javaid

(57) ABSTRACT

Methods and apparatus for transmitting information are provided. The method includes: a terminal device receives state indication information sent by a network device, the state indication information is used for indicating that the network device will switch from an ON state to an OFF state; and the terminal device performs cell selection according to the state indication information.

14 Claims, 6 Drawing Sheets

(56) References Cited

U.S. PATENT DOCUMENTS

2016/0330679 A1* 11/2016 Zhang et al. ......... H04W 48/16

FOREIGN PATENT DOCUMENTS

| CN | 105338638 A | 2/2016 |
|---|---|---|
| CN | 105474707 A | 4/2016 |
| EP | 2523508 A1 | 11/2012 |
| GB | 2506389 A | 4/2014 |
| JP | 2011223081 A | 11/2011 |
| JP | 2012529806 A | 11/2012 |
| JP | 2016042743 A | 3/2016 |
| WO | 2015109523 A1 | 7/2015 |
| WO | 2015154564 A1 | 10/2015 |

OTHER PUBLICATIONS

3GPP TS 36.300 V13.4.0; Jun. 2016; 3rd Generation Partnership Project; Technical Specification Group Radio Access Network; (E-UTRA); Overall description; Stage 2; (Release 13).
English translation of CN OA for China Application 201680087519.5 dated May 28, 2020.
3GPP TS 36.304; 3rd Generation Partnership Project; Technical Specification Group Radio Access Network; Evolved Universal Terrestrial Radio Access (E-UTRA); User Equipment (UE) procedures in idle mode; (Release 13).
3GPP TS 36.331; 3rd Generation Partnership Project; Technical Specification Group Radio Access Network; Evolved Universal Terrestrial Radio Access (E-UTRA); Radio Resource Control (RRC) Protocol Specification (Release 13).
English translation of JP Notice of Refusal for JP Application 2018-567107 dated Sep. 10, 2020.

* cited by examiner

100

A network device sends state indication information of the network device to a terminal device, and the state indication information is used for indicating that the network device will switch from an ON state to an OFF state, to enable the terminal device to perform cell selection according to the state indication information ~S110

The network device switches from the ON state to the OFF state ~S120

A terminal device receives state indication information sent by a network device, and the state indication information is used for indicating that the network device will switch from an ON state to an OFF state ~S210

The terminal device performs cell selection according to the state indication information ~S220

When a network device is in an ON state, the network device sends first information to a terminal device on a first resource block ~ S310

When the network device is in an OFF state, the network device does not send the first information to the terminal device on the first resource block ~ S320

A terminal device determines a state of a network device according to whether first information sent by the network device is received on a first physical resource block, and states of the network device include an OFF state and an ON state ~ S410

When the terminal device determines that the network device is in the OFF state, the terminal device performs cell selection ~ S420

FIG. 4

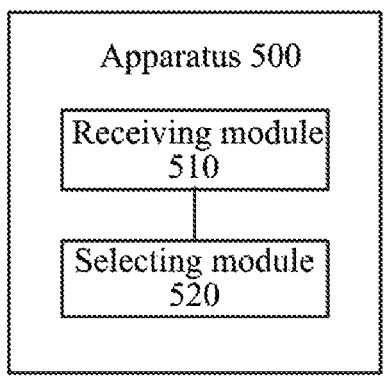

INFORMATION TRANSMISSION METHOD AND APPARATUS

CROSS-REFERENCE TO RELATED APPLICATION(S)

This application is a 371 application of International Application No. PCT/CN2016/098300, filed on Sep. 7, 2016, the entire disclosure of which is hereby incorporated by reference.

TECHNICAL FIELD

The present disclosure relates to the field of communication, in particular to methods and apparatus for transmitting information in the field of communication.

BACKGROUND

In a communication system at present, it is possible that a network device needs to be turned off under certain conditions, for example, turned off for saving power, but a terminal device cannot learn the state of the network device. If the network device is in an OFF state and the terminal device is not aware that the network device is in the OFF state, the terminal device still sends data to the network device in the OFF state, but the network device cannot receive the data; or the terminal device is not aware that the network device is in the OFF state and still waits for data transmission from the network at a specific time point. As such, the data cannot be normally received or sent by the terminal device, resulting in abnormal data transmission.

SUMMARY

Implementations of the present disclosure provide methods and apparatus for transmitting information.

In a first aspect, a method for transmitting information is provided, and the method includes: receiving, by a terminal device, state indication information sent by a network device, wherein the state indication information is used for indicating the network device to switch from an ON state to an OFF state; performing, by the terminal device, cell selection according to the state indication information.

In a first possible implementation mode of the first aspect, before the terminal device receives the state indication information sent by the network device, the method further includes: determining, by the terminal device, a first receiving time point of receiving the state indication information; and receiving, by the terminal device, the state indication information sent by the network device includes: receiving, by the terminal device, the state indication information sent by the network device at the first receiving time point.

In combination with the above possible implementation mode of the first aspect, in a second possible implementation mode of the first aspect, receiving, by the terminal device, the state indication information sent by the network device includes: receiving, by the terminal device, the state indication information sent by the network device at a time point of receiving a paging message.

In combination with the above possible implementation modes of the first aspect, in a third possible implementation mode of the first aspect, receiving, by the terminal device, the state indication information sent by the network device includes: starting, by the terminal device, a timer periodically or at a time point of receiving a paging message, and receiving, by the terminal device, the state indication information sent by the network device when the timer expires.

A duration of the timer may be configured by the network or specified by a protocol.

In combination with the above possible implementation modes of the first aspect, in a fourth implementation mode of the first aspect, receiving, by the terminal device, the state indication information sent by the network device includes: receiving, by the terminal device, the state indication information sent by the network device through a paging message.

In combination with the above possible implementation modes of the first aspect, in a fifth implementation mode of the first aspect, receiving, by the terminal device, the state indication information sent by the network device includes: receiving, by the terminal device, the state indication information sent by the network device through a system message.

In combination with the above possible implementation modes of the first aspect, in a sixth implementation mode of the first aspect, before the terminal device receives the state indication information sent by the network device through the system message, the method further includes: receiving, by the terminal device, the paging message sent by the network device, wherein the paging message carries change indication information of the system message, and the change indication information is used for indicating that the system message carries the state indication information, or the change indication information is used for indicating that the system message has changed. Receiving, by the terminal device, the state indication information of the network device sent by the network device through the system message includes: receiving, by the terminal device, the state indication information of the network device sent by the network device through the system message according to the change indication information.

In combination with the above possible implementation modes of the first aspect, in a seventh implementation mode of the first aspect, receiving, by the terminal device, the state indication information sent by the network device includes: receiving, by the terminal device, the state indication information of the network device sent by the network device through a physical channel or a media access control protocol data unit (MAC PDU).

In connection with the above possible implementation modes of the first aspect, in an eighth implementation mode of the first aspect, the state indication information includes first time indication information used for indicating a duration when the network device is OFF. For example, the first time indication information may be a timer, and when the timer expires, it is determined that the network device switches from the OFF state to the ON state.

In combination with the above possible implementation modes of the first aspect, in a ninth implementation mode of the first aspect, the state indication information further includes second time indication information used for indicating that the network device will be OFF after a first time period after the terminal device receives the state indication information.

In combination with the above possible implementation modes of the first aspect, in a tenth implementation mode of the first aspect, the terminal device is a terminal device in an idle state, or the terminal device is a terminal device in an inactive state.

In a second aspect, a method for transmitting information is provided, and the method includes: determining, by a terminal device, a state of a network device according to whether first information sent by the network device is received on a first physical resource block, wherein the state of the network device includes an OFF state and an ON state; and performing, by the terminal device, cell selection when the terminal device determines that the network device is in the OFF state.

In a first possible implementation mode of the second aspect, determining, by the terminal device, the state of the network device according to whether the first information sent by the network device is received on the first physical resource block includes: determining, by the terminal device, that the network device is in the OFF state when the terminal device does not receive the first information on the first physical resource block.

In combination with the above possible implementation mode of the second aspect, in a second implementation mode of the second aspect, determining, by the terminal device, that the network device is in the OFF state when the terminal device does not receive the first information on the first physical resource block, includes: determining, by the terminal device, that the network device is in the OFF state when the terminal device does not receive the first information on the first physical resource block at a time point of receiving a paging message.

In combination with the above possible implementation modes of the second aspect, in a third implementation mode of the second aspect, the terminal device is a terminal device in an idle state, or the terminal device is a terminal device in an inactive state.

In a third aspect, a method for transmitting information is provided, and the method includes: sending, by a network device, state indication information of the network device to a terminal device, wherein the state indication information is used for indicating that the network device will switch from an ON state to an OFF state, to enable the terminal device to perform cell selection according to the state indication information; switching the network device from the ON state to the OFF state.

In a first possible implementation mode of the third aspect, before the network device sends the state indication information of the network device to the terminal device, the method further includes: determining, by the network device, a first sending time point of sending the state indication information. Wherein sending, by the network device, the state indication information of the network device to the terminal device includes: sending, by the network device, the state indication information to the terminal device at the first sending time point.

In combination with the above possible implementation mode of the third aspect, in a second implementation mode of the third aspect, sending, by the network device, the state indication information of the network device to the terminal device includes: sending, by the network device, the state indication information to the terminal device at a time point of sending a paging message.

In combination with the above possible implementation modes of the third aspect, in a third implementation mode of the third aspect, sending, by the network device, state indication information of the network device to the terminal device includes: starting, by the network device, a timer periodically or at a time point of sending a paging message, and sending, by the network device, the state indication information to the terminal device when the timer expires.

In combination with the above possible implementation modes of the third aspect, in a fourth implementation mode of the third aspect, sending, by the network device, the state indication information of the network device to the terminal device includes: sending, by the network device, the state indication information to the terminal device through a paging message.

In combination with the above possible implementation modes of the third aspect, in a fifth implementation mode of the third aspect, sending, by the network device, the state indication information of the network device to the terminal device includes: sending, by the network device, the state indication information to the terminal device through a system message.

In combination with the above possible implementation modes of the third aspect, in a sixth implementation mode of the third aspect, before the network device sends the state indication information to the terminal device through the system message, the method further includes: sending, by the network device, a paging message to the terminal device, wherein the paging message carries change indication information of the system message, and the change indication information is used for indicating that the system message carries the state indication information of the network device, or the change indication information is used for indicating that the system message has changed. Sending, by the network device, the state indication information to the terminal device through the system message includes: sending, by the network device, the state indication information to the terminal device through the system message according to the change indication information.

In combination with the above possible implementation modes of the third aspect, in a seventh implementation mode of the third aspect, sending, by the network device, the state indication information of the network device to the terminal device includes: sending, by the network device, the state indication information to the terminal device through a physical channel or a media access control protocol data unit (MAC PDU).

In combination with the above possible implementation modes of the third aspect, in an eighth implementation mode of the third aspect, the state indication information includes first time indication information used for indicating a duration when the network device is OFF.

In combination with the above possible implementation modes of the third aspect, in a ninth implementation mode of the third aspect, the state indication information further includes second time indication information used for indicating that the network device will be OFF after a first time period after the terminal device receives the state indication information.

In combination with the above possible implementation modes of the third aspect, in a tenth implementation mode of the third aspect, the terminal device is a terminal device in an idle state, or the terminal device is a terminal device in an inactive state.

In a fourth aspect, a method for transmitting information is provided, and the method includes: sending, by the network device, first information to a terminal device on a first resource block when a network device is in an ON state; determining, by the network device, not to send the first information to the terminal device on the first resource block when the network device is in an OFF state.

In a first possible implementation mode of the fourth aspect, sending, by the network device, the first information to the terminal device on the first resource block when the network device is in the ON state includes: sending the first information to the terminal device on the first resource block when the network device is in the ON state at a time point of sending a paging message. Determining, by the network device, not to send the first information to the terminal device on the first resource block when the network device is in the OFF state includes: determining, by the network device, not to send the first information to the terminal device on the first resource block at a time point of sending a paging message when the network device is in the OFF state.

In a fifth aspect, an apparatus for transmitting information is provided for performing the method in any possible implementation mode of the first aspect or the first aspect described above. Specifically, the apparatus includes units for performing the method in the first aspect or any possible implementation mode of the first aspect described above.

In a sixth aspect, an apparatus for transmitting information is provided for performing the method in any possible implementation mode of the second aspect or the second aspect described above. Specifically, the apparatus includes units for performing the method in the second aspect or any possible implementation mode of the second aspect described above.

In a seventh aspect, an apparatus for transmitting information is provided for performing the method in any possible implementation mode of the third aspect or the third aspect described above. Specifically, the apparatus includes units for performing the method in the third aspect or any possible implementation mode of the third aspect described above.

In an eighth aspect, an apparatus for transmitting information is provided for performing the method in any possible implementation mode of the fourth aspect or the fourth aspect described above. Specifically, the apparatus includes units for performing the method in the fourth aspect or any possible implementation mode of the fourth aspect described above.

In a ninth aspect, an apparatus for transmitting information is provided, and the apparatus includes a receiver, a transmitter, a memory, a processor, and a bus system. The receiver, the transmitter, the memory, and the processor are connected through the bus system, and the memory is used for storing instructions, and the processor is used for executing the instructions stored in the memory to control the receiver to receive signals and control the transmitter to send signals. When the processor executes the instructions stored in the memory, the execution causes the processor to perform the method in the first aspect or any possible implementation mode of the first aspect.

In a tenth aspect, an apparatus for transmitting information is provided, and the apparatus includes a receiver, a transmitter, a memory, a processor, and a bus system. The receiver, the transmitter, the memory, and the processor are connected through the bus system, and the memory is used for storing instructions, and the processor is used for executing the instructions stored in the memory to control the receiver to receive signals and control the transmitter to send signals. When the processor executes the instructions stored in the memory, the execution causes the processor to perform the method in the second aspect or any possible implementation mode of the second aspect.

In an eleventh aspect, an apparatus for transmitting information is provided, and the apparatus includes a receiver, a transmitter, a memory, a processor, and a bus system. The receiver, the transmitter, the memory, and the processor are connected through the bus system, and the memory is used for storing instructions, the processor is used for executing the instructions stored in the memory to control the receiver to receive signals and control the transmitter to send signals. When the processor executes the instructions stored in the memory, the execution causes the processor to perform the method in the third aspect or any possible implementation mode of the third aspect.

In a twelfth aspect, an apparatus for transmitting information is provided, and the apparatus includes a receiver, a transmitter, a memory, a processor, and a bus system. The receiver, the transmitter, the memory, and the processor are connected through the bus system, the memory is used for storing instructions, the processor is used for executing the instructions stored in the memory to control the receiver to receive signals and control the transmitter to send signals. When the processor executes the instructions stored in the memory, the execution causes the processor to perform the method in the fourth aspect or any possible implementation mode of the fourth aspect.

In a thirteenth aspect, a system for transmitting information is provided, including the apparatus according to the fifth aspect and the apparatus according to the seventh aspect.

In a fourteenth aspect, a system for transmitting information is provided, including the apparatus according to the sixth aspect and the apparatus according to the eighth aspect.

In a fifteenth aspect, a computer readable medium is provided for storing a computer program, and the computer program includes instructions for performing the method in the first aspect or any possible implementation mode of the first aspect.

In a sixteenth aspect, a computer readable medium is provided for storing a computer program, and the computer program includes instructions for performing the method in the second aspect or any possible implementation mode of the second aspect.

In a seventeenth aspect, a computer readable medium is provided for storing a computer program, and the computer program includes instructions for performing the method in the third aspect or any possible implementation mode of the third aspect.

In an eighteenth aspect, a computer readable medium is provided for storing a computer program, and the computer program includes instructions for performing the method in the fourth aspect or any possible implementation mode of the fourth aspect.

BRIEF DESCRIPTION OF THE DRAWINGS

In order to explain the technical schemes of implementations of the present disclosure more clearly, drawings referred to in the description of the implementations or the related art will be briefly introduced below. Obviously, the drawings in the following description are only some implementations of the present disclosure. For those of ordinary skill in the art, other drawings may be obtained according to those drawings without paying an inventive effort.

FIG. 1 is a schematic diagram of a method for transmitting information according to an embodiment of the present disclosure.

FIG. 2 is a schematic diagram of another method for transmitting information according to an embodiment of the present disclosure.

FIG. 3 is a schematic diagram of yet another method for transmitting information according to an embodiment of the present disclosure.

FIG. 4 is a schematic diagram of still another method for transmitting information according to an embodiment of the present disclosure.

FIG. 5 is a schematic block diagram of an apparatus for transmitting information according to an embodiment of the present disclosure.

DETAILED DESCRIPTION

Figure 6:
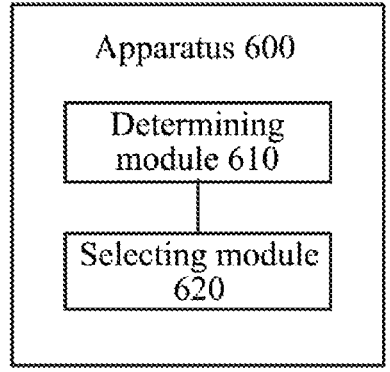
FIG. 6 is a schematic block diagram of another apparatus for transmitting information according to an embodiment of the present disclosure.

Technical schemes in implementations of the present disclosure will be described clearly and completely in the following with reference to the drawings in the implementations of the present disclosure. Obviously, the described implementations are part, but not all, of implementations of the present disclosure. Based on the implementations of the present disclosure, all other implementations obtained by a person of ordinary skill in the art without paying an inventive effort are within the protection scope of the present disclosure.

It should be understood that the technical schemes of the implementations of the present disclosure may be applied to various communication systems, such as Global System of Mobile communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Universal Mobile Telecommunication System (UMTS) or Worldwide Interoperability for Microwave Access (WiMAX) communication system, and other communication systems that may emerge in future.

It should also be understood that in implementations of the present disclosure, the terminal device may be referred to as User Equipment (UE), terminal device, Mobile Station (MS), Mobile Terminal, or terminal device in future 5G network, etc. The terminal device may communicate with one or more core networks via a Radio Access Network (RAN). For example, the terminal may be a mobile phone (or called "cellular" phone) or a computer with a mobile terminal, etc. For another example, the terminal may be portable, pocket-sized, hand-hold, built-in-computer, or vehicle-mounted mobile device. The terminal device exchanges voice and/or data with a wireless access network.

A network device may be used to communicate with mobile devices. The network device may be a Base Transceiver Station (BTS) in Global System of Mobile Communication (GSM) or Code Division Multiple Access (CDMA), or a base station (NodeB, NB) in Wideband Code Division Multiple Access (WCDMA), or an Evolution Node B (eNB or eNodeB) in LTE, or a relay or access point, or a vehicle-mounted device, wearable device or an access network device in future 5G network.

In an embodiment of the present disclosure, a state of a network device may be from an ON state to an OFF state, or from an OFF state to an ON state, or the state of the network device may be between an ON state and an OFF state, or the state of the network device may be a state defined in a future network system, which is not restricted in implementations of the present disclosure.

In an embodiment of the present disclosure, an idle state of a terminal device refers to a state in which context information the terminal device is not retained at the access network device side, there is no radio resource control (RRC) connection between the terminal device and the access network device, and control plane connection and data plane connection between the access network device and the core network device are released.

In an embodiment of the present disclosure, an inactive state of a terminal device refers to a state in which at least part of the context information of the terminal device is retained at the access network device side, and there is a control plane connection and a user plane connection between the access network device and the core network device. However, the terminal device in an inactive state may not report state information to the access network device in real time, and thus the core network device may not sense the movement of the terminal device when the terminal device moves. For example, when the terminal device moves from the range covered by a first base station to the range covered by a second base station, and the terminal device needs to transmit a little data, it may not need to hand over from the first station to the second station, instead, it transmits the data to the first station through the second station directly, thus the signaling overhead due to handover can be saved. Of course, the terminal device in an inactive state can process background services and small packet transmission, and it can perform a small amount of connection management and so on.

FIG. 1 shows a schematic flowchart of a method 100 for transmitting information according to an embodiment of the present disclosure. FIG. 1 shows acts or operations of a method for transmitting information, but these acts or operations are merely examples, and other operations or variations of the operations shown in FIG. 1 may be performed in implementations of the present disclosure. The method 100 includes acts S110 and S120.

In S110, a network device sends state indication information of the network device to a terminal device, and the state indication information is used for indicating that the network device will switch from an ON state to an OFF state, to enable the terminal device to perform cell selection according to the state indication information.

In S120, the network device switches from the ON state to the OFF state.

FIG. 2 shows a schematic flowchart of a method 200 for transmitting information according to an embodiment of the present disclosure. FIG. 2 shows acts or operations of a method for transmitting information, but these acts or operations are merely examples, and other operations or variations of the operations shown in FIG. 2 may be performed in implementations of the present disclosure. The method 200 includes acts S210 and S220.

In S210, a terminal device receives state indication information sent by a network device, and the state indication information is used for indicating that the network device will switch from an ON state to an OFF state.

In S220, the terminal device performs cell selection according to the state indication information.

Specifically, the network device sends its state indication information to the terminal device, and the terminal device may receive the state indication information and may determine that the network device is to switch from the ON state to the OFF state according to the received state indication information. The terminal device may select or reselect another cell to reside in after the terminal device acquires the state indication information of the network device. For example, a terminal device in a data connection state may perform handover according to the state indication information, and a terminal device in an idle state may reselect a cell according to the state indication information, thus ensuring normal transmission of data by the terminal devices in other cells. Of course, when a terminal device learns the state of a network device, the terminal device may still be in the cell covered by the network device when it does not need to transmit data.

Therefore, according to the state indication information, the terminal device may determine that the network device is to switch from an ON state to an OFF state, and it may select or reselect another cell to reside in, thus ensuring normal transmission of data by the terminal device in another cell. Of course, when a terminal device learns a state of a network device, the terminal device may still reside in a cell covered by the network device when there is no data to be transmitted.

Furthermore, for a terminal device in an idle state or an inactive state, when a network device needs to be OFF, the terminal device in the idle state or inactive state cannot learn the state of the network device, so the state indication information of the network device is sent to the terminal device in the idle state or inactive state. Thus the terminal device in the idle state or inactive state may select a new cell to reside in according to the state of the network device. Of course, the terminal device in the idle state or inactive state may select a new cell to reside in when there is data to be transmitted, and the terminal device in the idle state or inactive state may still reside in the cell of the current network device when there is no data to be transmitted.

Optionally, a specific manner by which the network device informs the terminal device of the state information of the network device may be specified in a network protocol or configured by the network, which is not restricted in implementations of the present disclosure. For example, it may be specified for the network device and the terminal device in a protocol that, when the network device sends a special signal on a specific first physical resource block, for example, the special signal is first information, when the terminal device can receive the first information on the first physical resource block, it determines that the network device is in an ON state currently; when the terminal device cannot receive the first information on the first physical resource block, it determines that the network device is in an OFF state currently, and the terminal device may select another cell to reside in.

As an optional embodiment, the state indication information includes first time indication information, which is used to indicate information of a duration when the network device is OFF. As such, after the terminal device receives the state indication information, it may determine the time when the network device is OFF according to the duration when the network device is OFF. For example, the duration information may be of a timer, and after the timer expires, the terminal device may determine that the network device is in an ON state, and it may reselect a cell covered by the network device or re-evaluate the cell covered by the network device to determine whether to select the cell covered by the network device.

The terminal device may determine a duration when the network is OFF according to the first time indication information in the state indication information, and after the terminal device learns the duration when the network device is OFF, the network device will switch from the OFF state to the ON state after the duration when the network device is OFF, thus the terminal device may reselect or evaluate the cell of the network device again. Optionally, after the terminal device obtains the duration when the network device is OFF, when the terminal device needs to transmit data during the duration when the network device is OFF, the terminal device reselects a cell covered by another network device. When the terminal device does not need to transmit data during the time period when the network device is OFF, the terminal device may continue to be in the cell covered by the network device.

As an optional embodiment, the state indication information further includes second time indication information for indicating that the network device will be OFF after a first time period after the terminal device receives the state indication information. The network device may indicate that the network device is to be OFF after a first time period, in the state indication information, and the network device is OFF after the first time period after sending the state indication information to the terminal device. After receiving the state indication information, the terminal device may determine that the network device will be OFF, that is, will be OFF after the first time period. For example, a timer may be used to time the first time period and the network device will be OFF when the timer expires.

In this way, the terminal device may learn that the network device will be OFF after the first time period, and the terminal device processes unfinished data within the first time period, such as completing cell reselection or handover within the first time period, to ensure data continuity.

As an optional embodiment, before S110, the method 100 further includes: the network device determines a first sending time point of sending the state indication information. In S110, the network device sends the state indication information to the terminal device at the first sending time point. Before S210, the method 200 further includes: the terminal device determines a first receiving time point of receiving the state indication information. In S210, the terminal device receives the state indication information sent by the network device at the first receiving time point.

Optionally, the terminal device determines that the first receiving time point of receiving the state indication information may be a time point of receiving other information in the related art, such as a time point of receiving a paging message; or, the first receiving time point may be a periodic time point, or an aperiodic time point, or a periodic and aperiodic alternate time point; or, the first receiving time point may be any time point within a time period during which reception may be allowed. The specific time point of receiving the state indication information may be configured by the network or specified by a protocol.

Specifically, the network device may send the state indication information at the first sending time point, the terminal device may receive the state indication information at the first receiving time point. Assuming that there is no time delay of data sending, the first sending time point may be the same time point as the first receiving time point. If there is a time delay of data sending, the network device may determine the first sending time point of sending the state indication information according to the time delay, so as to ensure that the terminal device can receive the state indication information at the first receiving time point. Specifically, the first sending time point and the first receiving time point may be specified in a network protocol, or the network device may configure the first receiving time point to ensure that the terminal device can receive the state indication information at the first receiving time point when the network device sends the state indication information at the first sending time point. Implementations of the present disclosure are not limited thereto.

It should be understood that the network device may send state indication information to multiple terminal devices. The network device may send state indication information to multiple terminal devices at the same time, and the multiple terminal devices receive the state indication information sent by the network device at the same time. Alternatively, the network device may periodically send state indication information to multiple terminal devices, and a specific terminal device receives the state indication information sent by the network device only at the time when it wakes up.

There are two implementation modes for a network device to determine the first sending time point of sending the state indication information, and two implementation modes for a terminal device to determine the first receiving time point of receiving the state indication information. In the first implementation mode in which the network device determines the first sending time point of sending the state indication information, the network device determines a time point of sending a paging message as the first sending time point of sending the state indication information. In the first implementation mode in which the terminal device determines the first receiving time point of receiving the state indication information, the terminal device determines the time point of receiving the paging message according to a paging period configured by the network device, and the terminal device determines the time point of receiving the paging message as the first receiving time point of receiving the state indication information. In the second implementation mode in which the network device determines the first sending time point of sending the state indication information, when a timer expires, the time point when the timer expires is determined as the first sending time point of sending the state indication information. In the second implementation mode in which the terminal device determines the first receiving time point of receiving the state indication information, when the timer expires, the time point when the timer expires is determined as the first receiving time point.

Further, timing durations of timers of the network device and the terminal device may be specified in a protocol, or the timing duration of the timer of the terminal device may be configured by the network device. The timer of the terminal device may be started periodically, and a time point when the timer expires is determined as the first receiving time point of receiving the state indication information by the terminal device. Alternatively, the timer is started at a time point of receiving a paging message, and a time point when the timer expires is the first time point of receiving the state indication information. The timer of the network device may be started periodically, and a time point when the timer expires is determined as the first sending time point of sending state indication information by the network device. Alternatively, the timer is started at a time point of sending a paging message, and a time point when the timer expires is the first sending time point of sending the state indication information.

Of course, the network device may not determine the first sending time point of sending the state indication information, and the terminal device may not determine the first receiving time point of receiving the state indication information. For example, the time points of sending and receiving the state indication information may be specified in a protocol or configured by the network. Optionally, in S110, the network device sends the state indication information to the terminal device at a time point of sending a paging message. In S210, the terminal device receives the state indication information sent by the network device at a time point of receiving the paging message. Optionally, in S110, the network device periodically starts a timer or starts a timer at a time point of sending a paging message, and when the timer expires, the network device sends the state indication information to the terminal device. In S210, the terminal device periodically starts a timer or starts a timer at a time point of receiving the paging message, and when the timer expires, the terminal device receives the state indication information sent by the network device.

The network device sends the state indication information of the network device to the terminal device, and the terminal device receives the state indication information sent by the network device, which may be realized in the following four implementation modes.

In the first implementation mode, the network device sends the state indication information to the terminal device through a paging message, and the terminal device receives the state indication information sent by the network device through the paging message. The network device may send the paging message to the terminal device at a time point for sending a paging message, and the terminal device receives the paging message at a time point for receiving a paging message to obtain the state indication information of the network device in the paging message. Optionally, of course, the network device may configure a timer for receiving the paging message for the terminal device, or it may send the paging message to the terminal device according to a set time of a timer specified by a protocol, and the terminal device receives the paging message sent by the network device according to the set time of the timer specified by the protocol or configured by the network.

In the second implementation mode, the network device sends the state indication information to the terminal device through a system message, and the terminal device receives the state indication information sent by the network device through a system message. Of course, the network device may configure a timer for the terminal device to receive the system message, or it may send the system message to the terminal device when a set time of a timer specified by a protocol expires, and the terminal device receives the system message sent by the network device when the set time of the timer specified by the protocol or configured by the network expires. The timer of the network device may be started periodically, and the timer of the terminal device may be started periodically. Of course, intervals of different durations may be set for the timer and the timer is started when each of the different durations expires. The specific time of starting the timer may be configured by the network or specified by the protocol, and the implementations of the present disclosure are not limited thereto. Optionally, the network device may send the system message to the terminal device at a time point of sending a paging message, and the terminal device receives the system message at a time point of receiving the paging message to obtain the state indication information of the network device in the system message. Of course, the network device may send the system message carrying the state indication information to the terminal device according to a time point for sending a system message in the related art, and the terminal device receives the system message carrying the state indication information according to a time point for receiving a system message.

That is, an existing paging message is used to carry the change indication information indicating that the system message has changed to inform that the system message has changed, or to inform that new state indication information is added to the system message to notify the terminal device that the state information is carried in the system message.

In the third implementation mode, the network device sends a paging message to the terminal device, the paging message carries change indication information of a system message, and the change indication information is used to indicate that the system message carries the state indication information of the network device, or the change indication information is used to indicate that the system message has changed, and then the network device sends the changed system message to the terminal device, and the system message carries the state indication information. The terminal device receives the paging message sent by the network device, determines that the system message has changed according to the change indication information of the system message in the paging message, or it determines that the system message carries the state indication information, and then the terminal device receives the changed system message and determines the state indication information in the system message. Specifically, the network device may send the paging message carrying the change indication information to the terminal device at a time point for sending a paging message, and the terminal device receives the paging message carrying the change indication information at a time point for receiving a paging message. The network device may send the system message carrying the state indication information to the terminal device at a time point for sending a system message, and the terminal device receives the system message carrying the state indication information sent by the network device at a time point for receiving a system message. Optionally, the network device sends the paging message carrying the change indication information to the terminal device when a first timer expires, and the terminal device receives the paging message carrying the change indication information sent by the network device when a second timer expires. The network device sends the system message carrying the state indication information to the terminal device when a third timer expires, and the terminal device receives the system message carrying the state indication information sent by the network device when a fourth timer expires. Of course, timing durations set for the first timer and the second timer may be equal or unequal, and timing durations set for the third timer and the fourth timer may be equal or unequal. Optionally, the network device may send the paging message carrying the change indication information to the terminal device when the first timer expires, and the terminal device may receive the paging message carrying the change indication sent by the network device when the second timer expires, of course timing durations set for the first timer and the second timer may be equal or unequal. The network device sends the system message carrying the state indication information to the terminal device at a time point for sending a system message, and the terminal device receives the system message carrying the state indication information sent by the network device at a time point for receiving a system message. Optionally, the network device may send the paging message carrying the change indication information at a time point for sending a paging message, and the terminal device may receive the paging message carrying the change indication information at a time point for receiving a paging message. The network device may send the system message carrying the state indication information at a time point for sending a paging message, and the terminal device may receive the system message carrying the state indication information at a time point for receiving a paging message.

In the fourth implementation mode, the network device sends the state indication information to the terminal device through a physical channel or a Media Access Control Protocol Data Unit (MAC PDU); the terminal device receives the state indication information of the network device sent by the network device through the physical channel or the MAC PDU. The network device may send the state indication information through the physical channel or the MAC PDU at a time point for sending a paging message, and the terminal device receives the state indication information sent on the physical channel or in the MAC PDU at a time point for receiving a paging message. Of course, the network device may configure for the terminal device a timer of sending the state indication information through the physical channel or MAC PDU, or it may send the state indication information to the terminal device through the physical channel or MAC PDU according to a set time of a timer specified by a protocol, and the terminal device receives a paging message sent by the network device through the physical channel or MAC PDU according to the set time of the timer specified by the protocol or configured by the network.

FIG. 3 shows a schematic flowchart of a method 300 for transmitting information according to an implementation of the present disclosure. FIG. 3 shows acts or operations of a method for transmitting information, but these acts or operations are merely examples, and other operations or variations of the operations shown in FIG. 3 may be performed in implementations of the present disclosure. The method 300 includes acts S310 and S320.

In S310, when a network device is in an ON state, the network device sends first information to a terminal device on a first resource block.

In S320, when the network device is in an OFF state, the network device does not send the first information to the terminal device on the first resource block.

FIG. 4 shows a schematic flowchart of a method 400 for transmitting information according to an implementation of the present disclosure. FIG. 4 shows acts or operations of a method for transmitting information, but these acts or operations are merely examples, and other operations or variations of the operations shown in FIG. 4 may be performed in implementations of the present disclosure. The method 400 includes acts S410 and S420.

In S410, a terminal device determines a state of a network device according to whether first information sent by the network device is received on a first physical resource block, and states of the network device include an OFF state and an ON state.

In S420, when the terminal device determines that the network device is in the OFF state, the terminal device performs cell selection.

As an optional implementation, in S410, when the terminal device does not receive the first information on the first physical resource block, the terminal device determines that the network device is in the OFF state. The first information is a special signal that can be recognized by both the network device and the terminal device to indicate the state of the network device.

As an optional implementation, in S420, when the network device is in the OFF state, the network device does not send the first information to the terminal device on the first resource block at the time point of sending a paging message. When the terminal device does not receive the first information on the first physical resource block, the terminal device determines that the network device is in the OFF state, which includes: when the terminal device does not receive the first information on the first physical resource block at the time point of receiving a paging message, the terminal device determines that the network device is in the OFF state. Optionally, in S310, the first information is sent to the terminal device on the first resource block at the time point of sending the paging message when the network device is in an ON state.

It should be understood that the time point when the network device sends or does not send the first information on the first resource block may be determined by a timer, and implementations of the present disclosure are not limited thereto.

Specifically, the network device sends the first information on the first resource block which may be the first resource block configured by the network device or specified by a protocol. For example, the network device configures the terminal device to receive the first information on the first resource block. Alternatively, the protocol specifies that the network device sends the first information on the first resource block and the terminal device receives the first information on the first resource block. Implementations of the present disclosure are not limited thereto. Of course, the network device may configure the terminal device to determine that the network device is in the OFF state when the terminal device does not receive the first information for multiple times within a specific period of time. Because it is possible that the network device does not send the first information to the terminal device on time for reasons such as network congestion, hence a threshold value may be set for the number of times of receiving the first information. The network device is determined to be in the OFF state when the number of times of receiving the first information is greater than the threshold value, and the network device is determined to be in the ON state when the number of times of receiving the first information is less than the threshold value, implementations of the present disclosure are not limited thereto.

As an optional implementation, the terminal device is a terminal device in an idle state, or the terminal device is a terminal device in an inactive state. For a terminal device in a data connection state, the network device may notify the terminal device through data signaling interaction with the terminal device in the connection state, but the network device cannot notify the terminal device which is in an idle state or in an inactive state. Therefore, in the embodiment of the present disclosure, the state indication information is carried in the paging message or in the system message, or the state indication information is carried through the physical channel or the MAC PDU, to notify the terminal device which is in an idle state or in an inactive state of the state of the network device. Thus, the terminal device which is in the idle state or inactive state may reselect another cell to ensure normal transmission of data.

It should be understood that, for the timer mentioned in the implementations of the present disclosure, a timing duration of the timer may be configured by the network device for the terminal device or specified by a protocol, and implementations of the present disclosure are not limited thereto.

It should also be understood that the manners in which the state indication information is sent and received in implementations of the present disclosure are merely examples, and the network device may encapsulate the state indication information to be transmitted to the terminal device at any layer, which may specifically be radio resource control (RRC) layer, media access control (MAC) layer, or physical layer, etc. Implementations of the present disclosure are not limited thereto.

Methods for transmitting information according to implementations of the present disclosure have been described above with reference to FIGS. 1 to 4. An apparatus and system for transmitting information according to implementations of the present disclosure will be described below with reference to FIGS. 5 to 14.

FIG. 5 shows a schematic diagram of an apparatus 500 for transmitting information according to an implementation of the present disclosure, for example, the apparatus may be a terminal device in the method 200, and the apparatus 500 includes a receiving module 510 and a selecting module 520.

The receiving module 510 is configured to receive state indication information sent by a network device, and the state indication information is used to indicate that the network device will switch from an ON state to an OFF state.

The selecting module 520 is configured to perform cell selection according to the state indication information.

As an optional implementation, the receiving module 510 is specifically configured to receive the state indication information sent by the network device at a time point of receiving a paging message.

As an optional implementation, the apparatus 500 further includes a starting module configured to start a timer periodically or start the timer at a time point of receiving a paging message. The receiving module 510 is further configured to receive the state indication information sent by the network device when the timer expires.

As an optional implementation, the receiving module 510 is further configured to receive the state indication information sent by the network device through a paging message.

As an optional implementation, the receiving module 510 is further configured to receive the state indication information sent by the network device through a system message.

As an optional implementation, the receiving module 510 is further configured to receive a paging message sent by the network device before receiving the state indication information sent by the network device through a system message, and the paging message carries change indication information of the system message, and the change indication information is used to indicate that the system message carries the state indication information, or the change indication information is used to indicate that the system message has changed. The receiving module 510 is further configured to receive the state indication information of the network device sent by the network device through the system message according to the change indication information.

As an optional implementation, the receiving module 510 is further configured to receive the state indication information of the network device sent by the network device through a physical channel or a media access control protocol data unit (MAC PDU).

As an optional implementation, the state indication information includes first time indication information for indicating a duration when the network device is OFF.

As an optional implementation, the state indication information further includes second time indication information for indicating that the network device will be OFF after a first time period after the apparatus 500 receives the state indication information.

As an optional implementation, the apparatus 500 is an apparatus in an idle state, or the apparatus 500 is an apparatus in an inactive state.

It should be understood that the apparatus 500 herein is embodied in a form of a functional module. The term "module" herein may refer to an Application Specific Integrated Circuit (ASIC), an electronic circuit, a processor (e.g., shared processor, proprietary processor, or group processor, etc.) for executing one or more software or firmware programs and a memory, a combinational logic circuit, and/or other suitable components that support the described functions. In an optional example, those skilled in the art would understand that the apparatus 500 may be embodied as a terminal device in the above-described implementations, and the apparatus 500 may be configured to perform various processes and/or acts corresponding to the terminal device in the above-described implementation of the method 200, and will not be described here in detail for avoiding repetition.

FIG. 6 shows a schematic diagram of an apparatus 600 for transmitting information according to an implementation of the present disclosure, for example, the apparatus may be a terminal device in the method 400, and the apparatus 600 includes a determining module 610 and a selecting module 620.

The determining module 610 is configured to determine a state of a network device according to whether first information sent by the network device is received on a first physical resource block. States of the network device include an OFF state and an ON state.

The selecting module 620 is configured to perform cell selection when it is determined that the network device is in the OFF state.

As an optional implementation, the determining module 610 is specifically configured to determine that the network device is in the OFF state when the apparatus 600 does not receive the first information on the first physical resource block.

As an optional implementation, the determining module 610 is further configured to determine that the network device is in the OFF state when the first information is not received on the first physical resource block at a time point of receiving a paging message.

It should be understood that the apparatus 600 herein is embodied in a form of a functional module. The term "module" herein may refer to an ASIC, an electronic circuit, a processor (e.g., shared processor, proprietary processor, or group processor, etc.) for executing one or more software or firmware programs and a memory, a combinational logic circuit, and/or other suitable components that support the described functions. In an optional example, those skilled in the art can understand that the apparatus 600 may be the terminal device in the method 400 of the above-mentioned implementation, and the apparatus 600 may be configured to perform various processes and/or acts corresponding to the terminal device in the above-mentioned method implementation, and will not be described here in detail for avoiding repetition.

Figure 7:
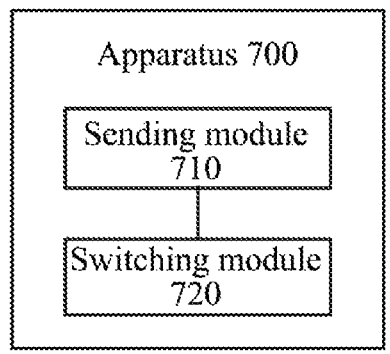
FIG. 7 is a schematic block diagram of yet another apparatus for transmitting information according to an embodiment of the present disclosure.

FIG. 7 shows a schematic diagram of an apparatus 700 for transmitting information according to an implementation of the present disclosure, for example, the apparatus may be a network device in the method 100, and the apparatus 700 includes a sending module 710 and a switching module 720.

The sending module 710 is configured to send state indication information of the apparatus to a terminal device, and the state indication information is used to indicate that the apparatus will switch from an ON state to an OFF state, to enable the terminal device to perform cell selection according to the state indication information.

The switching module 720 is configured to switch the apparatus 700 from the ON state to the OFF state.

As an optional implementation, the sending module 710 is specifically configured to send the state indication information to the terminal device at a time point of sending a paging message.

As an optional implementation, the apparatus 700 further includes a starting module configured to start a timer periodically or start the timer at a time point of sending a paging message. The sending module 710 is also specifically configured to send the state indication information to the terminal device when the timer expires.

As an optional implementation, the sending module 710 is specifically configured to send the state indication information to the terminal device through a paging message.

As an optional implementation, the sending module 710 is further configured to send the state indication information to the terminal device through a system message.

As an optional implementation, the sending module 710 is further configured to send a paging message to the terminal device before sending the state indication information to the terminal device through a system message, and the paging message carries the change indication information of the system message, and the change indication information is used to indicate that the system message carries the state indication information, or the change indication information is used to indicate that the system message has changed. The sending module 710 is further configured to send the state indication information to the terminal device through the system message according to the change indication information.

As an optional implementation, the sending module 710 is further configured to send the state indication information to the terminal device through a physical channel or a media access control protocol data unit (MAC PDU).

As an optional implementation, the state indication information includes first time indication information for indicating a duration when the apparatus 700 is OFF.

As an optional implementation, the state indication information further includes second time indication information for indicating that the apparatus 700 will be OFF after a first time period after the terminal device receives the state indication information.

As an optional implementation, the terminal device is a terminal device in an idle state, or the terminal device is a terminal device in an inactive state.

It should be understood that the apparatus 700 herein is embodied in a form of a functional module. The term "module" herein may refer to an ASIC, an electronic circuit, a processor (e.g., shared processor, proprietary processor, or group processor, etc.) for executing one or more software or firmware programs and a memory, a combinational logic circuit, and/or other suitable components that support the described functions. In an optional example, those skilled in the art may understand that the apparatus 700 may be a network device in the method 100 described above, and the apparatus 700 may be configured to perform various processes and/or acts corresponding to the network device in the implementation of the method 100 described above, and will not be described here in detail for avoiding repetition.

Figure 8:
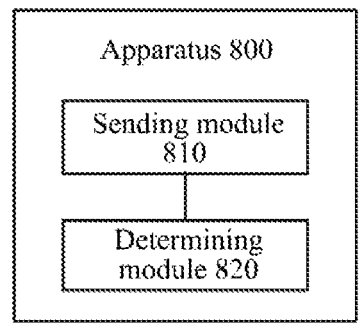
FIG. 8 is a schematic block diagram of still another apparatus for transmitting information according to an embodiment of the present disclosure.

FIG. 8 shows a schematic diagram of an apparatus 800 for transmitting information according to an implementation of the present disclosure, for example, the apparatus may be a network device in the method 300, and the apparatus 800 includes a sending module 810 and a determining module 820.

The sending module 810 is configured to send first information to a terminal device on a first resource block when the apparatus 800 is in an ON state.

The determining module 820 is configured to determine not to send the first information to the terminal device on the first resource block when the apparatus 800 is in an OFF state.

As an optional implementation, the sending module 810 is specifically configured to send the first information to the terminal device on the first resource block at a time point of sending a paging message when the apparatus 800 is in the ON state. The determining module 820 is specifically configured to determine not to send the first information to the terminal device on the first resource block at a time point of sending a paging message when the apparatus 800 is in the OFF state.

It should be understood that the apparatus 800 herein is embodied in a form of a functional module. The term "module" herein may refer to an ASIC, an electronic circuit, a processor (e.g., shared processor, proprietary processor, or group processor, etc.) for executing one or more software or firmware programs and a memory, a combinational logic circuit, and/or other suitable components that support the described functions. In an optional example, those skilled in the art may understand that the apparatus 800 may be a network device in the method 300 described above, and the apparatus 800 may be configured to perform various processes and/or acts corresponding to the network device in the method implementation described above, and will not be described here in detail for avoiding repetition.

Figure 9:
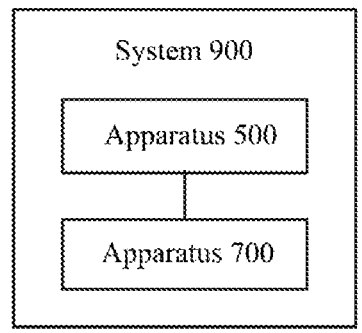
FIG. 9 is a schematic block diagram of a system for transmitting information according to an embodiment of the present disclosure.

FIG. 9 is a schematic block diagram of a system 900 for transmitting information according to an implementation of the present disclosure. The system 900 includes the apparatus 500 and the apparatus 700.

Figure 10:
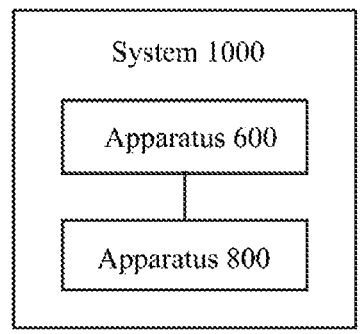
FIG. 10 is a schematic block diagram of another system for transmitting information according to an embodiment of the present disclosure.

FIG. 10 is a schematic block diagram of a system 1000 for transmitting information according to an implementation of the present disclosure. The system 1000 includes the apparatus 600 and the apparatus 800.

Figure 11:
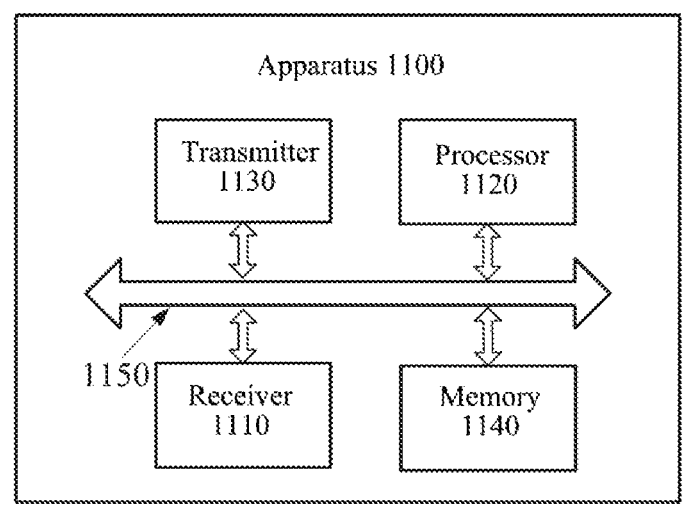
FIG. 11 is a schematic block diagram of an apparatus for transmitting information according to an embodiment of the present disclosure.

FIG. 11 shows an apparatus 1100 for transmitting information provided by an implementation of the present disclosure. For example, the apparatus 1100 may be a terminal device in the method 200, and the apparatus 1100 includes a receiver 1110, a processor 1120, a transmitter 1130, a memory 1140, and a bus system 1150. The receiver 1110, the processor 1120, the transmitter 1130, and the memory 1140 are connected through a bus system 1150, and the memory 1140 is used for storing instructions, and the processor 1120 is used for executing instructions stored in the memory 1140 to control the receiver 1110 to receive signals and control the transmitter 1130 to send instructions.

The receiver 1110 is configured to receive state indication information sent by a network device, and the state indication information is used to indicate that the network device will switch from an ON state to an OFF state. The processor 1120 is configured to perform cell selection according to the state indication information.

As an optional implementation, the receiver 1110 is specifically configured to receive the state indication information sent by the network device at a time point of receiving a paging message.

As an optional implementation, the processor 1120 is also configured to start a timer periodically or start the timer at a time point of receiving a paging message. The receiver 1110 is also specifically configured to receive the state indication information sent by the network device when the timer expires.

As an optional implementation, the processor 1120 is also specifically configured to, when the timer expires, determine a time point when the timer expires as a first receiving time point of receiving the state indication information.

As an optional implementation, the receiver 1110 is specifically configured to receive the state indication information sent by the network device through a paging message.

As an optional implementation, the receiver 1110 is also specifically configured to receive the state indication information sent by the network device through a system message.

As an optional implementation, the receiver 1110 is further configured to receive a paging message sent by the network device before receiving the state indication information sent by the network device through a system message, and the paging message carries change indication information of the system message, and the change indication information is used to indicate that the state indication information is carried in the system message, or the change indication information is used to indicate that the system message has changed. The receiver 1110 is also specifically configured to receive the state indication information of the network device sent by the network device through the system message according to the change indication information.

As an optional implementation, the receiver 1110 is also specifically configured to receive the state indication information of the network device sent by the network device through a physical channel or a media access control protocol data unit (MAC PDU).

As an optional implementation, the state indication information includes first time indication information for indicating a duration when the network device is OFF.

As an optional implementation, the state indication information further includes second time indication information for indicating that the network device will be OFF after a first time period after the apparatus 1100 receives the state indication information.

As an optional implementation, the apparatus 1100 is an apparatus in an idle state, or the apparatus 1100 is an apparatus in an inactive state.

It should be understood that the apparatus 1100 may be embodied as a terminal device in the above-described implementations and may be configured to perform various acts and/or processes corresponding to the terminal device in the above-described method implementations. Optionally, the memory 1140 may include a read only memory and a random access memory and provide instructions and data to the processor. A portion of the memory may also include a non-volatile random access memory. For example, the memory may also store device type information. The processor 1120 may be used for executing instructions stored in the memory, and when the processor executes the instructions, the processor may perform various acts corresponding to the terminal device in the implementation of the method 200 described above.

Figure 12:
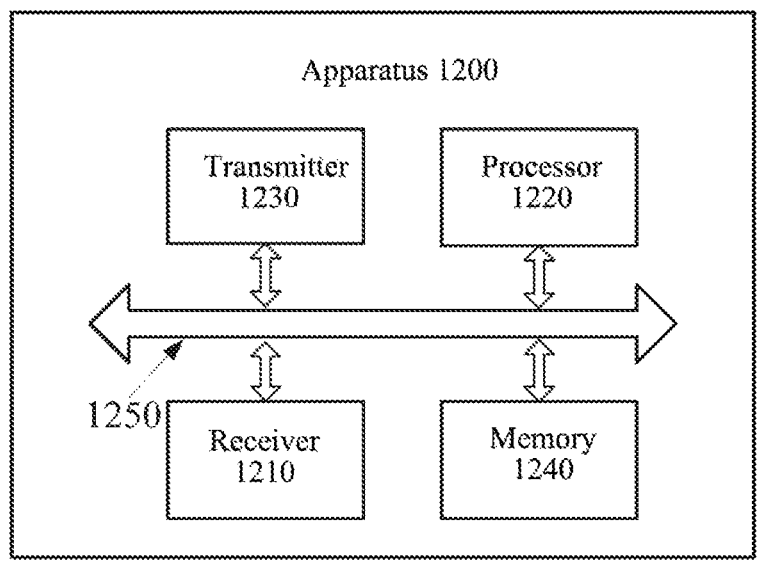
FIG. 12 is a schematic block diagram of another apparatus for transmitting information according to an embodiment of the present disclosure.

FIG. 12 shows an apparatus 1200 for transmitting information provided by an implementation of the present disclosure. For example, the apparatus may be a terminal device in the method 400, and the apparatus 1200 includes a receiver 1210, a processor 1220, a transmitter 1230, a memory 1240, and a bus system 1250. The receiver 1210, the processor 1220, the transmitter 1230, and the memory 1240 are connected through the bus system 1250, and the memory 1240 is used for storing instructions, and the processor 1220 is used for executing instructions stored in the memory 1240 to control the receiver 1210 to receive signals and control the transmitter 1230 to send instructions.

The processor 1220 is configured to determine a state of a network device according to whether first information sent by the network device is received on a first physical resource block, states of the network device including an OFF state and an ON state; and when determining that the network device is in the OFF state, perform cell selection.

As an optional implementation, the processor 1220 is specifically configured to determine that the network device is in the OFF state when the apparatus 1200 does not receive the first information on the first physical resource block.

As an optional implementation, the processor 1220 is also specifically configured to determine that the network device is in the OFF state when the first information is not received on the first physical resource block at a time point of receiving a paging message.

It should be understood that the apparatus 1200 may be a terminal device in the above-described implementations and may be configured to perform various acts and/or processes corresponding to the terminal device in the above-described method implementations. Optionally, the memory 1240 may include a read only memory and a random access memory and provide instructions and data to the processor. A portion of the memory may also include a non-volatile random access memory. For example, the memory may also store device type information. The processor 1220 may be configured to execute instructions stored in the memory, and when the processor executes the instructions, the processor may perform various acts corresponding to the terminal device in the above method implementations.

Figure 13:
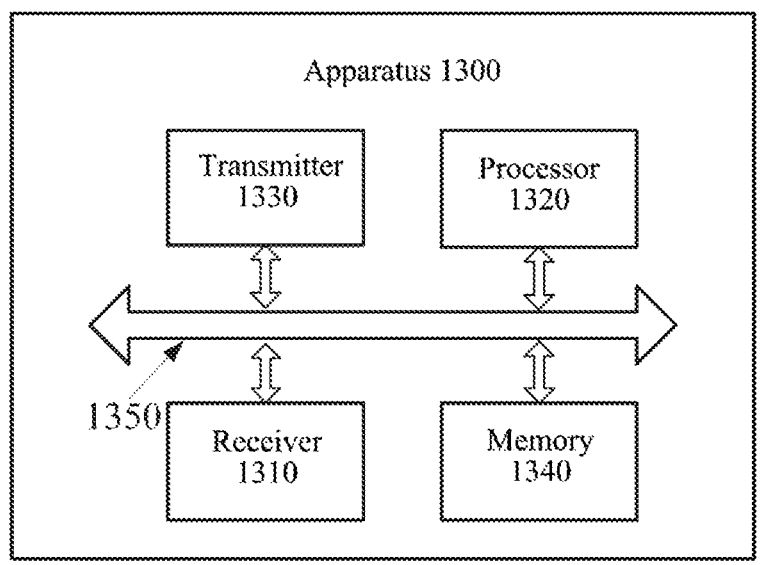
FIG. 13 is a schematic block diagram of yet another apparatus for transmitting information according to an embodiment of the present disclosure.

FIG. 13 shows an apparatus 1300 for transmitting information provided by an implementation of the present disclosure. For example, the apparatus may be a network device in the method 100, and the apparatus 1300 includes a receiver 1310, a processor 1320, a transmitter 1330, a memory 1340, and a bus system 1350. The receiver 1310, the processor 1320, the transmitter 1330, and the memory 1340 are connected through the bus system 1350, and the memory 1340 is used for storing instructions, and the processor 1320 is used for executing instructions stored in the memory 1340 to control the receiver 1310 to receive signals and control the transmitter 1330 to send instructions.

The transmitter 1330 is configured to send state indication information of the apparatus to a terminal device, and the state indication information is used to indicate that the apparatus will switch from an ON state to an OFF state, to enable the terminal device to perform cell selection according to the state indication information. The processor 1320 is configured to switch the apparatus 1300 from the ON state to the OFF state.

As an optional implementation, the transmitter 1330 is specifically configured to send the state indication information to the terminal device at a time point of sending a paging message.

As an optional implementation, the processor 1320 is also configured to start a timer periodically or start the timer at a time point of sending a paging message. The transmitter 1330 is also specifically configured to send the state indication information to the terminal device when the timer expires.

As an optional implementation, the processor 1320 is also specifically configured to determine a time point when the timer expires as a first sending time point of sending the state indication information.

As an optional implementation, the transmitter 1330 is also specifically configured to send the state indication information to the terminal device through a paging message.

As an optional implementation, the transmitter 1330 is also specifically configured to send the state indication information to the terminal device through a system message.

As an optional implementation, the transmitter 1330 is further configured to send a paging message to the terminal device before sending the state indication information to the terminal device through a system message, and the paging message carries the change indication information of the system message, and the change indication information is used to indicate that the state indication information is carried in the system message, or the change indication information is used to indicate that the system message has changed. The transmitter 1330 is also specifically configured to send the state indication information to the terminal device through the system message according to the change indication information.

As an optional implementation, the transmitter 1330 is also specifically configured to send the state indication information to the terminal device through a physical channel or a media access control protocol data unit (MAC PDU).

As an optional implementation, the state indication information includes first time indication information for indicating a duration when the apparatus 1300 is OFF.

As an optional implementation, the state indication information further includes second time indication information for indicating that the apparatus 1300 will be OFF after a first time period after the terminal device receives the state indication information.

As an optional implementation, the terminal device is a terminal device in an idle state, or the terminal device is a terminal device in an inactive state.

It should be understood that the apparatus 1300 may be a network device in the above-described implementations and may be configured to perform various acts and/or processes corresponding to the network device in the above-described method implementations. Optionally, the memory 1340 may include a read only memory and a random access memory and provide instructions and data to the processor. A portion of the memory may also include a non-volatile random access memory. For example, the memory may also store device type information. The processor 1320 may be used for executing instructions stored in the memory, and when the processor executes the instructions, the processor may perform various acts corresponding to the network device in the above method implementations.

Figure 14:
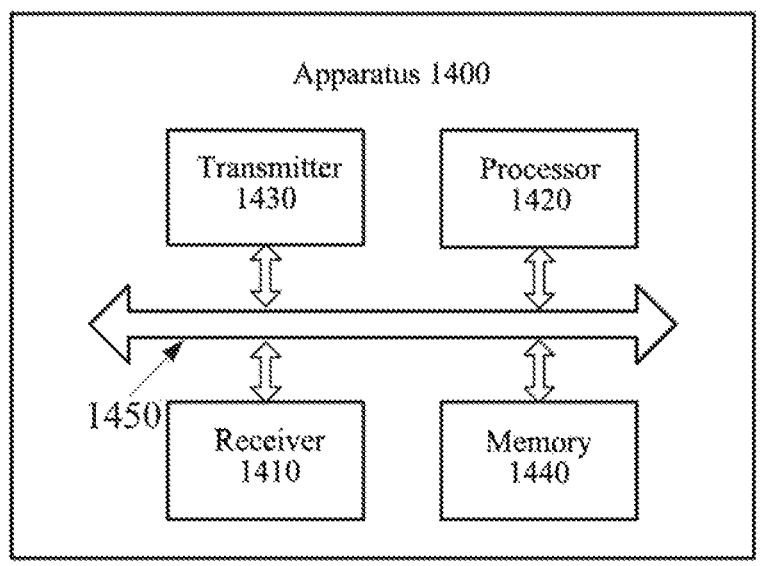
FIG. 14 is a schematic block diagram of still another apparatus for transmitting information according to an embodiment of the present disclosure.

FIG. 14 shows an apparatus 1400 for transmitting information provided by an implementation of the present disclosure. For example, the apparatus may be a network device in the method 300, and the apparatus 1400 includes a receiver 1410, a processor 1420, a transmitter 1430, a memory 1440, and a bus system 1450. The receiver 1410, the processor 1420, the transmitter 1430, and the memory 1440 are connected through the bus system 1450, and the memory 1440 is used for storing instructions, and the processor 1420 is used for executing instructions stored in the memory 1440 to control the receiver 1410 to receive signals and control the transmitter 1430 to send instructions.

The transmitter 1430 is configured to send first information to a terminal device on a first resource block when the apparatus 1400 is in an ON state. The processor 1420 is configured to determine not to send the first information to the terminal device on the first resource block when the apparatus 1400 is in an OFF state.

As an optional implementation, the transmitter 1430 is specifically configured to send the first information to the terminal device on the first resource block at a time point of sending a paging message when the apparatus 800 is in the ON state. The processor 1420 is specifically configured to determine not to send the first information to the terminal device on the first resource block at a time point of sending the paging message when the apparatus 800 is in the OFF state.

It should be understood that the apparatus 1400 may be a network device in the above-described implementations and may be configured to perform various acts and/or processes corresponding to the network device in the above-described method implementations. Optionally, the memory 1440 may include a read only memory and a random access memory and provide instructions and data to the processor. A portion of the memory may also include a non-volatile random access memory. For example, the memory may also store device type information. The processor 1420 may be used for executing instructions stored in the memory, and when the processor executes the instructions, the processor may perform various acts corresponding to the network device in the above method implementations.

It should be understood that in implementations of the present disclosure, the processor 1120, the processor 1220, the processor 1320, and the processor 1420 may be a central processing unit (CPU), or other general purpose processors, digital signal processors (DSP), application specific integrated circuits (ASIC), field programmable gate arrays (FPGA) or other programmable logic devices, discrete gate or transistor logic devices, or discrete hardware components, etc. The general purpose processor may be a microprocessor or any conventional processor etc.

It should be understood that the term "and/or" herein is merely an association relationship describing associated objects, indicating that there may be three relationships, for example, a and/or b may indicate three situations: a alone, a and b at the same time, and b alone. In addition, the symbol "/" in this document generally indicates that the objects before and after the symbol are in an "or" relationship.

It should be understood that in various implementations of the present disclosure, the value of a sequence number in the above-mentioned process does not mean an order of execution, and an order of execution of each process should be determined by its function and internal logic, and should not constitute any limitation on an implementation process of the implementation of the present disclosure.

Those of ordinary skill in the art will recognize that the exemplary elements and algorithm acts described in connection with the implementations disclosed herein can be implemented in electronic hardware, or a combination of computer software and electronic hardware. Whether these functions are performed in hardware or software depends on the specific application and design constraints of the technical solution. Skilled in the art may use different methods to implement the described functions for each particular application, but such implementation should not be considered to be beyond the scope of the present disclosure.

Those skilled in the art can clearly understand that for convenience and conciseness of description, corresponding processes in the aforementioned method implementations may be referred to for the specific working processes of the system, device, and unit described above, which are not repeated here.

In several implementations provided by the present disclosure, it should be understood that the disclosed system, apparatus and method may be implemented in other ways. For example, the apparatus implementations described above are only illustrative, for example, the categorization of the units is only a logical function categorization, and there may be other categorization modes in actual implementation. For example, multiple units or components may be combined or integrated into another system, or some features may be ignored or not executed. On the other hand, the mutual coupling or direct coupling or communication connection shown or discussed may be indirect coupling or communication connection through some interfaces, apparatuses or units, and may be electrical, mechanical or in other forms.

The unit described as a separate unit may or may not be physically separated, and the unit shown as a unit may or may not be a physical unit, i.e., may be located in one place or may be distributed over multiple network units. Some or all of the elements can be selected according to actual needs to achieve the purpose of the implementation.

In addition, various functional units in various implementations of the present disclosure may be integrated into one processing unit, may be physically present in each unit alone, or two or more units may be integrated into one unit.

The functions may be stored in a computer readable storage medium if implemented in the form of software functional units and sold or used as separate products. Based on this understanding, the technical solution of the present disclosure, in essence, or the part contributing to the related art, or the part of the technical solution, may be embodied in the form of a software product stored in a storage medium, including several instructions for causing a computer device (which may be a personal computer, a server, or a network device, etc.) to perform all or part of the acts of the method described in various implementations of the present disclosure. The aforementioned storage media include U disk, mobile hard disk, read-only memory (ROM), random access memory (RAM), magnetic disk or optical disk, and other media capable of storing program codes.

The foregoing are merely exemplary implementations of the present disclosure, but the protection scope of the present disclosure is not limited thereto. Any person skilled in the art can easily conceive changes or substitutions within the technical scope disclosed by the present disclosure, which should be included within the protection scope of the present disclosure. Therefore, the protection scope of the present disclosure should be subject to the protection scope of the claims.

I claim:
1. A method for transmitting information, comprising:
starting, by a terminal device, a timer periodically or at a time point of receiving a paging message;

receiving, by the terminal device, state indication information sent by a network device when the timer expires, wherein the state indication information is used for indicating that the network device will switch from an ON state to an OFF state;

performing, by the terminal device, cell selection according to the state indication information;

determining, by the terminal device, the state of the network device according to whether first information sent by the network device is received on a first physical resource block, wherein states of the network device comprise the OFF state and the ON state; and performing, by the terminal device, cell selection when the terminal device determines that the network device is in the OFF state.

2. The method of claim 1, wherein receiving, by the terminal device, the state indication information sent by the network device comprises:

receiving, by the terminal device, the state indication information sent by the network device through a paging message, or, receiving, by the terminal device, the state indication information sent by the network device;

receiving, by the terminal device, the state indication information sent by the network device through a system message.

3. The method of claim 2, wherein before the terminal device receives the state indication information sent by the network device through the system message, the method further comprises:

receiving, by the terminal device, a paging message sent by the network device, wherein the paging message carries change indication information of the system message, and the change indication information is used for indicating that the system message carries the state indication information, or the change indication information is used for indicating that the system message has changed; and receiving, by the terminal device, the state indication information of the network device sent by the network device through the system message comprises:

receiving, by the terminal device, the state indication information of the network device sent by the network device through the system message according to the change indication information.

4. The method of claim 1, wherein receiving, by the terminal device, the state indication information sent by the network device comprises:

receiving, by the terminal device, the state indication information of the network device sent by the network device through a physical channel or a media access control protocol data unit (MAC PDU).

5. The method of claim 1, wherein the terminal device is a terminal device in an idle state, or the terminal device is a terminal device in an inactive state.

6. The method of claim 1, wherein determining, by the terminal device, the states of the network device according to whether the first information sent by the network device is received on the first physical resource block comprises:

determining, by the terminal device, that the network device is in the OFF state when the terminal device does not receive the first information on the first physical resource block, and wherein determining, by the terminal device, that the network device is in the OFF state when the terminal device does not receive the first information on the first physical resource block comprises:

determining, by the terminal device, that the network device is in the OFF state when the terminal device does not receive the first information on the first physical resource block at a time point of receiving a paging message.

7. A method for transmitting information, comprising:

starting, by a network device, a timer periodically or at a time point of sending a paging message;

sending, by the network device, state indication information of the network device to a terminal device when the timer expires, wherein the state indication information is used for indicating that the network device will switch from an ON state to an OFF state, to enable the terminal device to perform cell selection according to the state indication information;

switching the network device from the ON state to the OFF state;

sending, by the network device, first information to the terminal device on a first resource block when the network device is in an ON state; and determining, by the network device, not to send the first information to the terminal device on the first resource block when the network device is in an OFF state.

8. An apparatus for transmitting information, comprising:

a receiver configured to receive state indication information sent by a network device when a timer expires, wherein the state indication information is used for indicating that the network device will switch from an ON state to an OFF state; and a processor configured to:

perform cell selection according to the state indication information and start the timer periodically or at a time point of receiving a paging message;

determine the state of the network device according to whether first information sent by the network device is received on a first physical resource block, wherein the states of the network device comprise the OFF state and the ON state; and perform cell selection when the network device is determined to be in the OFF state.

9. The apparatus of claim 8, wherein the receiver is configured to:

receive the state indication information sent by the network device at a time point of receiving a paging message.

10. The apparatus of claim 8, wherein the receiver is further configured to:

receive the state indication information sent by the network device through a paging message, or, wherein the receiver is specifically further configured to:

receive the state indication information sent by the network device through a system message.

11. The apparatus of claim 10, wherein the receiver is further configured to:

receive a paging message sent by the network device before receiving the state indication information sent by the network device through the system message, wherein the paging message carries change indication information of the system message, and the change indication information is used for indicating that the system message carries the state indication information, or the change indication information is used for indicating that the system message has changed; and the receiver is specifically further configured to receive the state indication information of the network device sent by the network device through the system message according to the change indication information.

12. The apparatus of claim 8, wherein the receiver is further configured to:
  receive the state indication information of the network device sent by the network device through a physical channel or a media access control protocol data unit (MAC PDU).

13. The apparatus of claim 8, wherein the apparatus is an apparatus in an idle state or the apparatus is an apparatus in an inactive state.

14. The apparatus of claim 8, wherein the processor is further configured to:
  determine that the network device is in the OFF state when the first information is not received on the first physical resource block, and
  wherein the processor is specifically further configured to:
  determine that the network device is in the OFF state when the first information is not received on the first physical resource block at a time point of receiving a paging message.

\* \* \* \* \*